US011001434B1

(12) United States Patent
Jordan (10) Patent No.: US 11,001,434 B1
(45) Date of Patent: May 11, 2021

(54) PORTABLE CONTAINER KIT WITH INSULATED CONTAINER AND LID

(71) Applicant: Rigwa Life, LLC, Mount Pleasant, SC (US)

(72) Inventor: Zachary W. Jordan, Mount Pleasant, SC (US)

(73) Assignee: Rigwa Life, LLC, Mt. Pleasant, SC (US)

( * ) Notice: Subject to any disclaimer, the term of this patent is extended or adjusted under 35 U.S.C. 154(b) by 0 days.

(21) Appl. No.: 16/853,671

(22) Filed: Apr. 20, 2020

(51) Int. Cl.
*B65D 43/02* (2006.01)
*B65D 81/38* (2006.01)
*B65D 51/16* (2006.01)
*B65D 25/04* (2006.01)
*A47J 41/02* (2006.01)

(52) U.S. Cl.
CPC ........ *B65D 81/3818* (2013.01); *A47J 41/022* (2013.01); *B65D 25/04* (2013.01); *B65D 43/022* (2013.01); *B65D 51/1683* (2013.01); *B65D 2543/0049* (2013.01); *B65D 2543/00092* (2013.01); *B65D 2543/00546* (2013.01); *B65D 2543/00953* (2013.01)

(58) Field of Classification Search
CPC ............ B65D 81/3818; B65D 51/1683; B65D 43/0214; B65D 21/0233; B65D 81/203; B65D 81/3806; B65D 81/383; B65D 43/0202; B65D 2543/00546
USPC ................................ 220/804, 526, 789, 790
See application file for complete search history.

(56) References Cited

U.S. PATENT DOCUMENTS

| | | | |
|---|---|---|---|
| 4,119,231 A * | 10/1978 | Johnson | A47J 47/14 206/499 |
| 5,088,301 A | 2/1992 | Piepenbrink | |
| 5,579,946 A | 12/1996 | Rowan et al. | |
| 5,974,686 A | 11/1999 | Nomura et al. | |
| 6,283,316 B1 * | 9/2001 | Sherman | B65D 47/06 215/6 |
| 6,948,334 B1 | 9/2005 | Challenger | |
| 2018/0273259 A1* | 9/2018 | Lane | B65D 51/1688 |
| 2020/0172290 A1* | 6/2020 | Serrahima | B65D 25/2858 |
| 2020/0172292 A1* | 6/2020 | Serrahima | B65D 25/2858 |

FOREIGN PATENT DOCUMENTS

EP 0839726 B1 1/2002

* cited by examiner

*Primary Examiner* — Stephen J Castellano
(74) *Attorney, Agent, or Firm* — Gregory Finch; Finch Paolino, LLC (57) ABSTRACT

A storage container kit with an insulated bowl and lid. Aspects of the present disclosure provide for a storage container kit comprising a first container having insulated walls, a first lid having an insulated portion extending between an upper surface and a lower surface of the first lid and configured to establish a pressurized seal with the first container, a second container configured to be housed within an interior portion of the first container, and a second lid configured to be removably coupled to an upper circumference of the second container. In some embodiments, the first lid is configured to be selectively interfaced with the first container to create a pressurized seal between a gasket, inner side walls of the first container, and a plug being removably coupled to a pressure release aperture in the first lid.

5 Claims, 13 Drawing Sheets

PORTABLE CONTAINER KIT WITH INSULATED CONTAINER AND LID

FIELD

The present disclosure relates to the field of food storage containers; in particular, a portable container kit with an insulated container and lid.

BACKGROUND

Portable insulated containers can be used for temporarily storing drinks or foods, or other products that may benefit from a cooled or warmed environment. Insulated containers that are easily transportable are known and can be used for a variety of purposes. Included are containers which are designed for temporary storage of food, drink or other perishable items for use in connection with personal travel, day trips, outings, and other similar activities where such perishable items need to be kept cool or warm for some period of time, typically several hours.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

An aspect of the present disclosure is a storage container kit comprising an insulated container comprising a bottom, outer side walls defining an outer surface, and inner side walls defining an inner surface, the outer surface and the inner surface being sealed at an upper perimeter to define an open top, wherein the outer surface and the inner surface are configured to define an internal cavity comprising a vacuum insulated portion; and an insulated lid comprising an upper surface defining a first perimeter, a lower surface defining a second perimeter, an insulating portion extending between the upper surface and the lower surface, a gasket disposed on the second perimeter, an aperture disposed on the lower surface and configured to enable the passage of air through the insulated lid, and a plug configured to removably interface with the aperture, wherein the insulated lid is configured to be selectively interfaced with the insulated container to create a pressurized seal between the gasket, the inner side walls of the insulated container, and the plug.

In accordance with certain embodiments, the food storage container kit includes a cap coupled to the insulated lid that is operably enabled to engage the plug with the aperture in a first configuration and disengage the plug from the aperture in a second configuration. In certain embodiments, the insulated lid is configured to displace a volume of air from an interior portion of the insulated container through the aperture where the cap is configured in the second configuration. The insulated lid may be configured to create the pressurized seal in response to selectively configuring the cap from the second configuration to the first configuration. The insulated lid may be further configured to release the pressurized seal in response to selectively configuring the cap from the first configuration to the second configuration.

Another aspect of the present disclosure is a food storage container kit comprising a first container comprising an outer bottom and outer side walls defining an outer surface, and inner bottom and inner side walls defining an inner surface, the outer surface and the inner surface being sealed at an upper perimeter to define an open top, wherein the outer surface and the inner surface are configured to define an internal cavity comprising a vacuum insulated portion; a first lid comprising an upper surface defining a first perimeter, a lower surface defining a second perimeter, an insulating portion extending between the upper surface and the lower surface, a gasket disposed on the second perimeter, an aperture disposed on the lower surface and configured to enable the passage of air through the insulated lid, and a plug configured to removably interface with the aperture to create an airtight seal between the plug and the aperture; a second container comprising a bottom and side walls defining an open top, wherein the second container is configured to be housed within an interior portion of the first container; and a second lid comprising an upper surface and a lower surface, wherein the upper surface and the lower surface are configured to define a channel being disposed around a perimeter of the lower surface, wherein the channel is configured to be selectively interfaced with the side walls of the second container to cover the open top of the second container, wherein the upper surface of the second lid is configured to be in contact with the lower surface of the first lid when the second container is housed within the first container and the second lid is selectively interfaced with the second container and the first lid is selectively interfaced with the first container.

In accordance with certain embodiments, the first lid may be configured to be selectively interfaced with the first container to create a pressurized seal between the gasket, the inner side walls of the first container, and the plug. The food storage container kit may further comprise a cap that is movably coupled to the first lid. The cap may be selectively configured to engage the plug with the aperture in a first configuration and disengage the plug from the aperture in a second configuration. In certain embodiments, the first lid may be configured to displace a volume of air from an interior portion of the first container through the aperture where the cap is configured in the second configuration. The first lid may be configured to create the pressurized seal in response to selectively configuring the cap from the second configuration to the first configuration. The first lid may be further configured to release the pressurized seal in response to selectively configuring the cap from the first configuration to the second configuration. In accordance with certain embodiments, the second container may comprise at least one divider extending between a first side wall and a second side wall to define two or more interior portions of the second container.

Yet another aspect of the present disclosure is a food storage container kit comprising a first container comprising an outer bottom and outer side walls defining an outer surface, and inner bottom and inner side walls defining an inner surface, the outer surface and the inner surface being sealed at an upper perimeter to define an open top, wherein the outer surface and the inner surface are configured to define an internal cavity comprising a vacuum insulated portion; a first lid comprising an upper surface defining a first perimeter, a lower surface defining a second perimeter, an insulating portion extending between the upper surface and the lower surface, a gasket disposed on the second perimeter, an aperture disposed on the lower surface and configured to enable the passage of air through the insulated lid, and a plug configured to removably interface with the aperture to create an airtight seal between the plug and the aperture; a second container comprising a bottom and side walls defining an open top, and at least one divider disposed on the bottom and side walls to define two or more interior portions of the second container, wherein the second container is configured to be housed within an interior portion of the first container; and a second lid comprising an upper surface and a lower surface, wherein the upper surface and the lower surface are configured to define a channel configured to be selectively interfaced with the side walls and the at least one divider of the second container, wherein the upper surface of the second lid is configured to be in contact with the lower surface of the first lid when the second container is housed within the first container and the second lid is selectively interfaced with the second container and the first lid is selectively interfaced with the first container.

In accordance with certain embodiments, the first lid may be configured to be selectively interfaced with the first container to create a pressurized seal between the gasket, the inner side walls of the first container, and the plug. The plug may be moveably coupled to the first lid such that the plug is able to be selectively configured between a first configuration and a second configuration. In certain embodiments, the first lid is configured to displace a volume of air from the interior portion of the first container through the aperture where the plug is configured in the second configuration. The first lid may be further configured to create the pressurized seal in response to selectively configuring the plug from the second configuration to the first configuration. The first lid may be still further configured to release the pressurized seal in response to selectively configuring the plug from the first configuration to the second configuration.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative description with reference to the following drawings in which.

DETAILED DESCRIPTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout. All definitions, as defined and used herein, should be understood to control over dictionary definitions, definitions in documents incorporated by reference, and/or ordinary meanings of the defined terms.

The terminology used herein is for describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including,", and variants thereof, when used herein, specify the presence of stated features, steps, operations, elements, and/or components, but do not preclude the presence or addition of one or more other features, steps, operations, elements, components, and/or groups thereof. As used herein, "exemplary" means serving as an example or illustration and does not necessarily denote ideal or best.

It will be understood that when an element is referred to as being "coupled," "connected," or "responsive" to another element, it can be directly coupled, connected, or responsive to the other element, or intervening elements may also be present. In contrast, when an element is referred to as being "directly coupled," "directly connected," or "directly responsive" to another element, there are no intervening elements present. As used herein, the term "and/or" includes any and all combinations of one or more of the associated listed items.

Spatially relative terms, such as "above," "below," "upper," "lower," "top, "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly. Well-known functions or constructions may not be described in detail for brevity and/or clarity.

It will be understood that, although the terms "first," "second," etc. may be used herein to describe various elements, these elements should not be limited by these terms. These terms are only used to distinguish one element from another. Thus, a first element could be termed a second element without departing from the teachings of the present embodiments. Unless otherwise defined, all terms (including technical and scientific terms) used herein have the same meaning as commonly understood by one of ordinary skill in the art to which these embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein, "exemplary" means serving as an example or illustration and does not necessarily denote ideal or best.

As used herein, the term "includes" means includes but is not limited to, and the term "including" means including but not limited to. The term "based on" means based at least in part on.

In accordance with various aspects of the present disclosure, an exemplary storage container kit comprises a first container having insulated walls, a first lid having an insulated portion extending between an upper surface and a lower surface of the first lid and configured to establish a pressurized seal with the first container, a second container configured to be housed within an interior portion of the first container, and a second lid configured to be removably coupled to an upper circumference of the second container. Certain embodiments of the present disclosure provide for an upper surface of the second lid to be in contact with a lower surface of the first lid when the second container is housed within the first container and the second lid is removably coupled to the second container and the first lid is selectively interfaced with the first container. In some embodiments, the first lid is configured to be selectively interfaced with the first container to create a pressurized seal between a gasket, inner side walls of the first container, and a plug being removable coupled to a pressure release aperture in the first lid.

FIGS. 1A-8 are attached hereto to the following detailed description and are incorporated herein by reference in their entireties. The following detailed description refers to the accompanying FIGS. 1A-8, in which the same reference numbers in different figures identify the same or similar elements throughout.

Figure 1A:
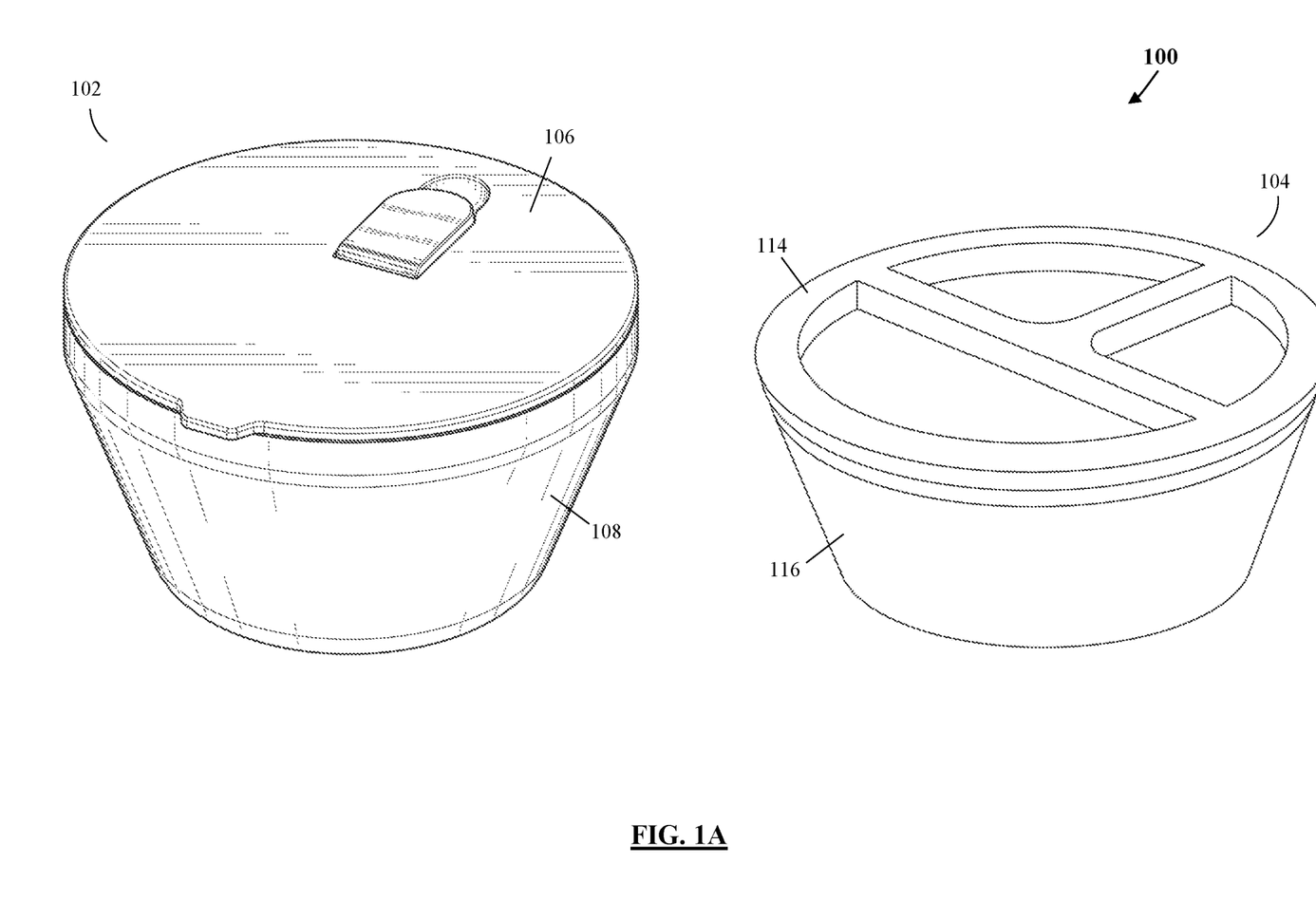
FIG. 1A is a perspective view of a storage container kit, in accordance with an embodiment.
Figure 1B:
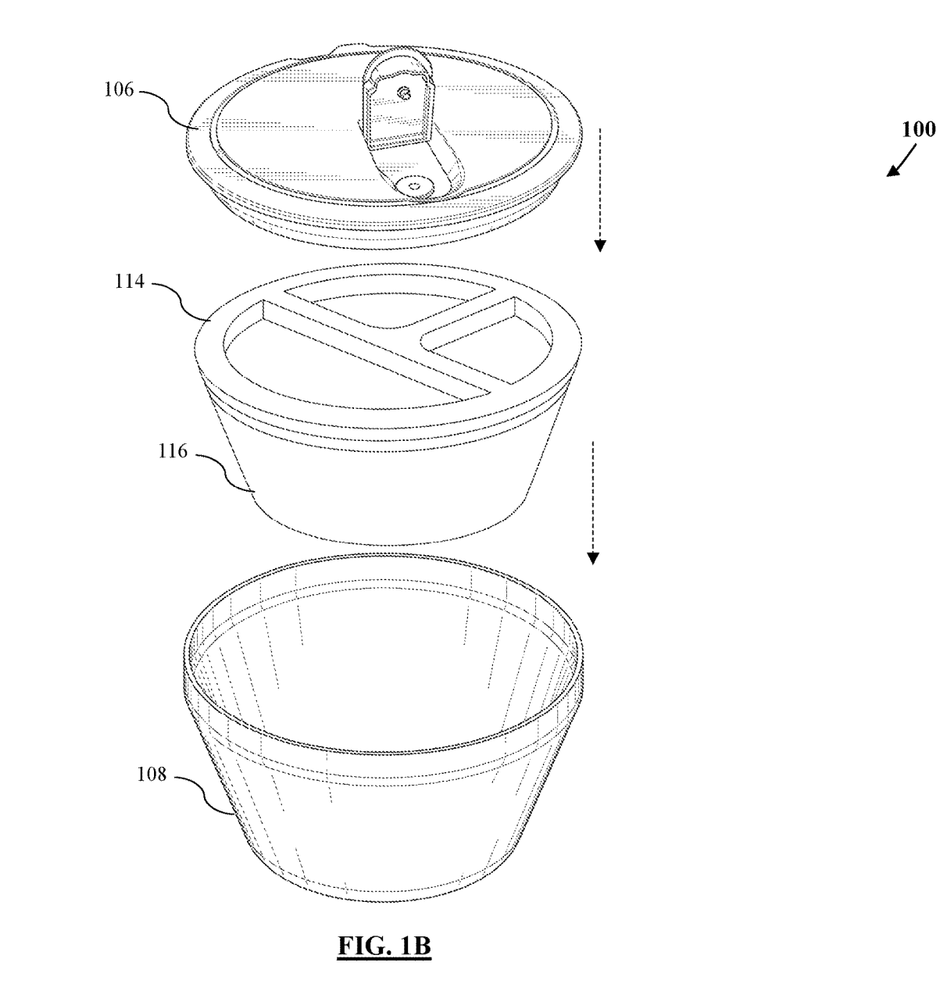
FIG. 1B is an assembly diagram of a storage container kit, in accordance with an embodiment.

Referring now to FIGS. 1A and 1B, illustrations of a storage container kit 100 are shown. In accordance with an embodiment, a storage container kit 100 is comprised of an outer container assembly 102 and an inner container assembly 104. In some embodiments, storage container kit 100 may be comprised of only the outer container assembly 102. Outer container assembly 102 may be comprised of an insulated container 108 and an insulated lid 106. Inner container assembly 104 may be comprised of an inner container 116 and an inner container lid 114. In accordance with certain embodiments, storage container kit 100 is configured wherein insulated container 108 is configured to receive inner container 116 and inner container lid 114, wherein inner container lid 114 is removably coupled to inner container 116 to comprise inner container assembly 104, and insulated lid 106 is configured to interface with an open top of insulated container 108 and an upper surface of inner container lid 114. In certain embodiments, insulated lid 106 is configured to establish a pressurized seal with insulated container 108 such that outer container assembly 102 defines an airtight interior portion in which inner container assembly 104 is selectively housed. In accordance with certain embodiments, insulated container 108, insulated lid 106 and inner container assembly 104 are configured such that inner container assembly 104 is fixedly secured (i.e. any lateral and vertical movement is restricted) when housed in the interior portion of insulated container 108 and the pressurized seal is established between insulated container 108 and insulated lid 106. Inner container assembly 104 may be freely removed from the interior portion of insulated container 108 upon depressurizing the pressurized seal and removing insulated lid 106 from the open top of insulated container 108.

Figure 2A:
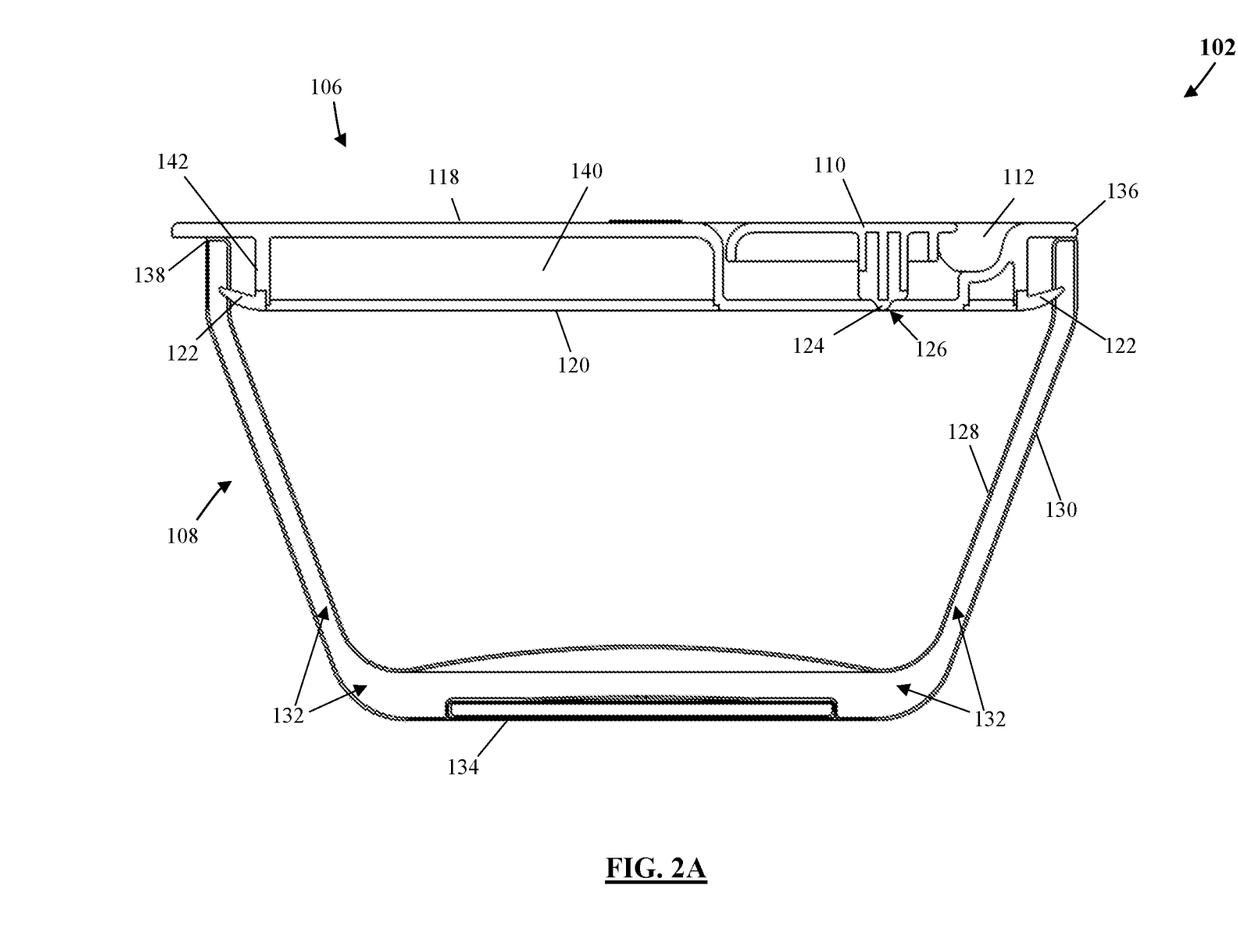
FIG. 2A is a cross-sectional view of an outer container assembly, in accordance with an embodiment.
Figure 2B:
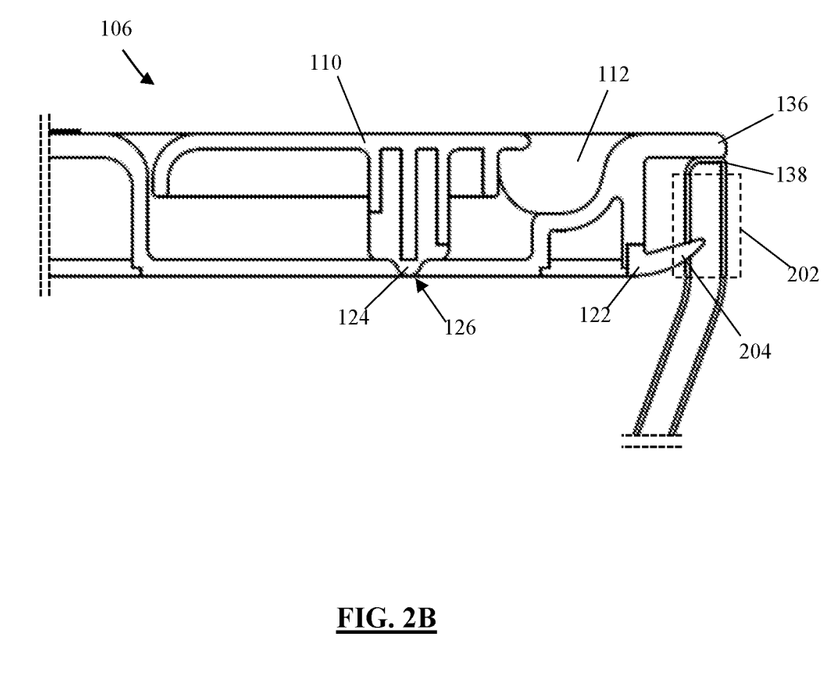
FIG. 2B a magnified cross-sectional view of an outer container assembly, in accordance with an embodiment.

Referring now to FIGS. 2A and 2B, a cross-sectional view of outer container assembly 102 is shown. In accordance with an embodiment, outer container assembly 102 is comprised of insulated container 108 and lid insulated lid 106. Insulated container 108 may be comprised of a bottom portion 134, outer side walls 130, and inner side walls 128. In certain embodiments, insulated container 108 is constructed from a metal material, such as stainless steel. In certain embodiments, insulated container 108 is constructed from glass, plastic, and the like. In accordance with an embodiment, outer side walls 130 and inner side walls 128 are sealed at an upper portion of insulated container 108 to define a rim 138. Rim 138 may comprise a thickness in the range of about three millimeters to about ten millimeters such that outer side walls 130 and inner side walls 128 are configured to define an internal cavity extending between outer side walls 130 and inner side walls 128 comprising an insulated portion 132. In certain embodiments, insulated portion 132 is airtight and at least partially evacuated of air to comprise a vacuum insulated portion. In other embodiments, insulated portion 132 comprises an air gap that is not vacuum insulated. In still further embodiments, insulated portion 132 comprises an insulating material, such as foam or gel.

Still referring to FIGS. 2A and 2B, insulated lid 106 may be comprised of an upper lid surface 118, a lower lid surface 120 and a lid wall 142 extending between upper lid surface 118 and lower lid surface 120. Insulated lid 106 may be constructed from rubber, plastic, and the like. In certain embodiments, upper lid surface 118, lower lid surface 120 and lid wall 142 may be configured to comprise an internal cavity comprising a lid insulating portion 140. Lid insulating portion 140 may comprise an insulating means, such as a foam insulation, a gel-based insulation, or a vacuum insulation. In accordance with certain embodiments, insulated lid 106 may further comprise a rubber gasket 122 being disposed around a circumference of lid wall 142 and adjacent to lower lid surface 120. In certain embodiments, rubber gasket 122 may comprise a gasket flange 204 configured to extend laterally from lid wall 142. Rubber gasket 122 may be configured to establish an airtight seal between insulated lid 106 and inner side walls 128 of insulated container 108. In certain embodiments, inner side walls 128 may comprise a vertical side wall portion 202. Insulated lid 106 may comprise a ledge portion 136 extending laterally from lid wall 142 and defining an upper perimeter of insulated lid 106. Ledge portion 136 may be configured such that ledge portion 136 is configured to interface with ridge 138 such that lower lid surface 120 and lid wall 142 may be located in an interior portion of insulated container 108 when a lower surface of ledge portion 136 is interfaced with ridge 138. In accordance with an embodiment, lid wall 142 and vertical side wall portion 202 are configured to each comprise a height wherein rubber gasket 122 is configured to be operably interfaced to establish an airtight seal with vertical side wall portion 202 when ledge portion 136 is interfaced with ridge 138.

Still referring to FIGS. 2A and 2B, insulated lid 106 may be further comprised of a cap 110 being located in a cavity portion 112 of insulated lid 106. Cap 110 may be moveably coupled to a surface of insulated lid 106 such that cap 110 may be selectively configured in a range of motion of approximately 90 degrees; although the range of motion may be in the range of about 15 degrees to about 60 degrees, in accordance with certain embodiments. Cap 110 may be configured to define or comprise a plug 124. Cavity portion 112 may be configured to comprise a port 126 comprising an aperture configured to enable air to pass therethrough. Plug 124 and port 126 may be respectively configured wherein plug 124 is configured to mateably interface with port 126 to establish an airtight seal. Plug 124 may be disposed on cap 110 such that plug 124 may be disengaged from port 126 when cap 110 is configured in an open configuration, and mateably interfaced with port 126 when cap 110 is configured in a closed configuration.

Figure 3:
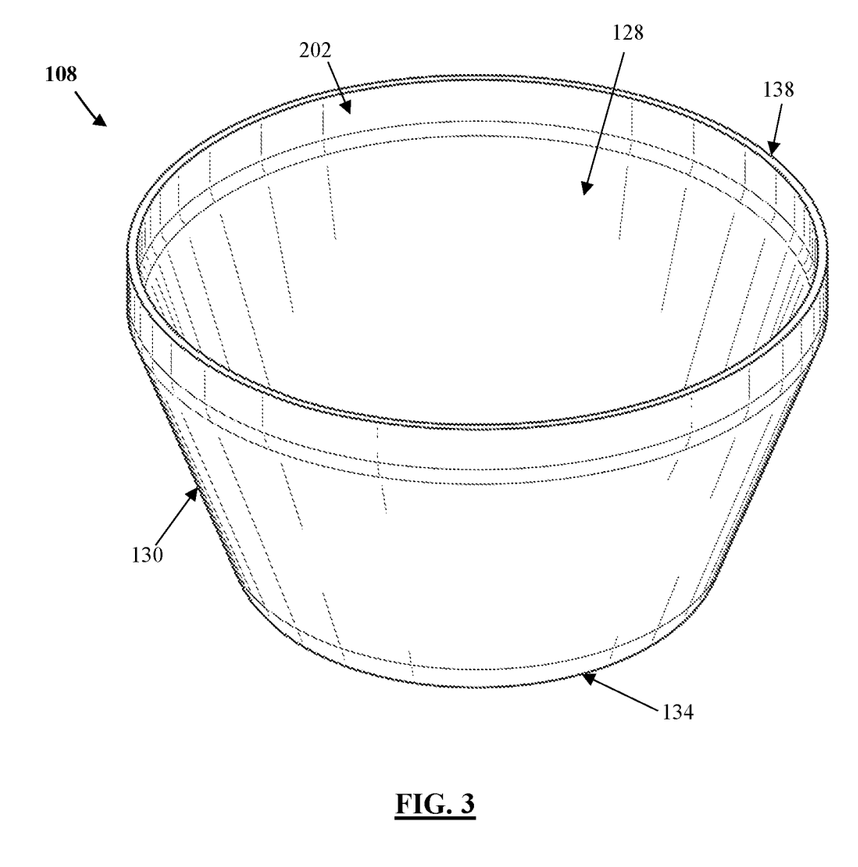
FIG. 3 is a perspective view of an insulated container, in accordance with an embodiment.

Referring now to FIG. 3, a perspective view of insulated container 108 is shown. In accordance with an embodiment, insulated container 108 may be configured in the shape of a bowl and may have an upper circumference defined by ridge 138 and a lower circumference defined by bottom portion 134. Insulated container 108 may be comprised of inner side walls 128 defining an inner surface of insulated container 108 and outer side walls 130 defining an outer surface of insulated container 108. Inner side walls 128 may be configured to comprise a vertical side wall portion 202 being disposed around a circumference of the inner surface and adjacent to ridge 138.

Referring now to FIGS. 4A-4D (with cross-reference to FIG. 2A), multiple views of insulated lid 106 are shown. In accordance with an embodiment, cap 110 is located in cavity portion 112 and is movably coupled to insulated lid 106 to enable a vertical range of motion of cap 110 of about 15 degrees to about 90 degrees. The vertical range of motion of cap 110 may comprise a first configuration of cap 110 and a second configuration of cap 110. In accordance with certain embodiments, the first configuration may comprise a closed position in which cap 110 is configured in a zero-degree range of motion relative to insulated lid 106. The second configuration may comprise an open position in which cap 110 is configured in a range of motion greater than zero-degrees relative to insulated lid 106. In certain embodiments, cap 110 is configured to insert plug 124 into port 126 wherein cap 110 is configured from the second configuration (i.e. open) to the first configuration (i.e. closed). Plug 124 and port 126 may each comprise a mechanical interface configured to selectively couple plug 124 to port 126 when cap 110 is configured in the first configuration (i.e. closed). The mechanical interface may comprise a mateable structure configured to enable plug 124 to be friction-locked within port 126. Insulated lid 106 may further comprise a port gasket 144 disposed around port 124. In certain embodiments, cap 110 is configured to compress port gasket 144 to create an airtight seal between plug 124 and port 126, when cap 110 is configured in a closed position. In accordance with certain embodiments, insulated lid 106 may further comprise a lip portion 206 and a cutaway portion 208 being disposed on the upper perimeter of insulated lid 106. Lip portion 206 and cutaway portion 208 may be configured to enable a user of food storage container kit 100 to apply upward force to insulated lid 106 in order to disconnect insulated lid 106 from insulated container 108.

Figure 5:
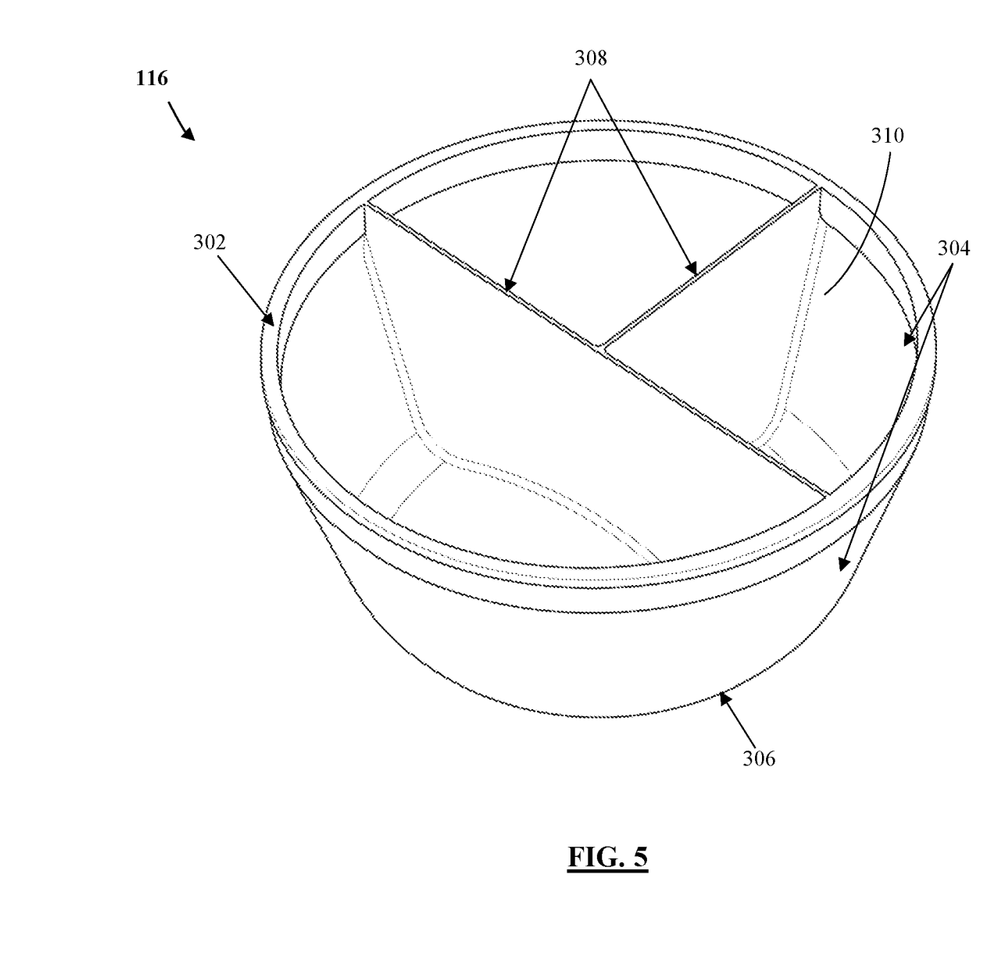
FIG. 5 is a perspective view of an inner container, in accordance with an embodiment.

Referring now to FIG. 5, a perspective view of inner container 116 is shown. In accordance with an embodiment, inner container 116 comprises a bottom portion 306, side walls 304 extending from bottom portion 306 and defining an inner surface and an outer surface, and a rim 302. In accordance with certain embodiments, inner container 116 may further comprise one or more divider 308 extending from one or more of side walls 304 to define two or more divided areas 310. Divider 308 may be coupled to side walls 304 and bottom portion 306 such that each of the two or more divided areas 310 are watertight to enable containment of different contents (e.g. solids and/or liquids) within each of the two or more divided areas 310.

Figure 6A:
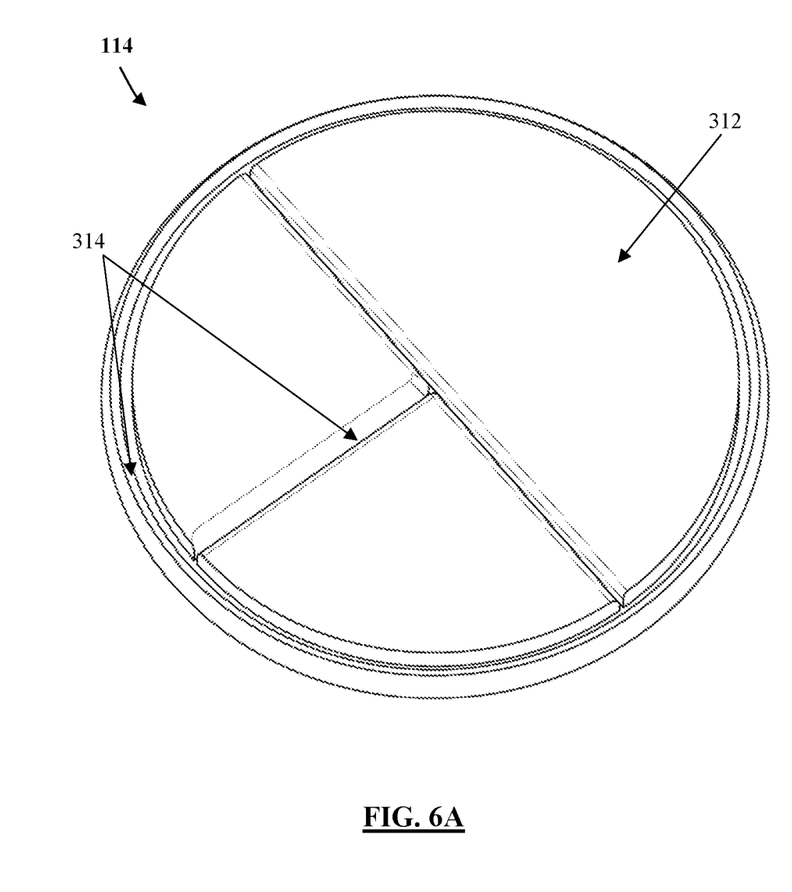
FIG. 6A is a perspective view of an inner container lid, in accordance with an embodiment.
Figure 6B:
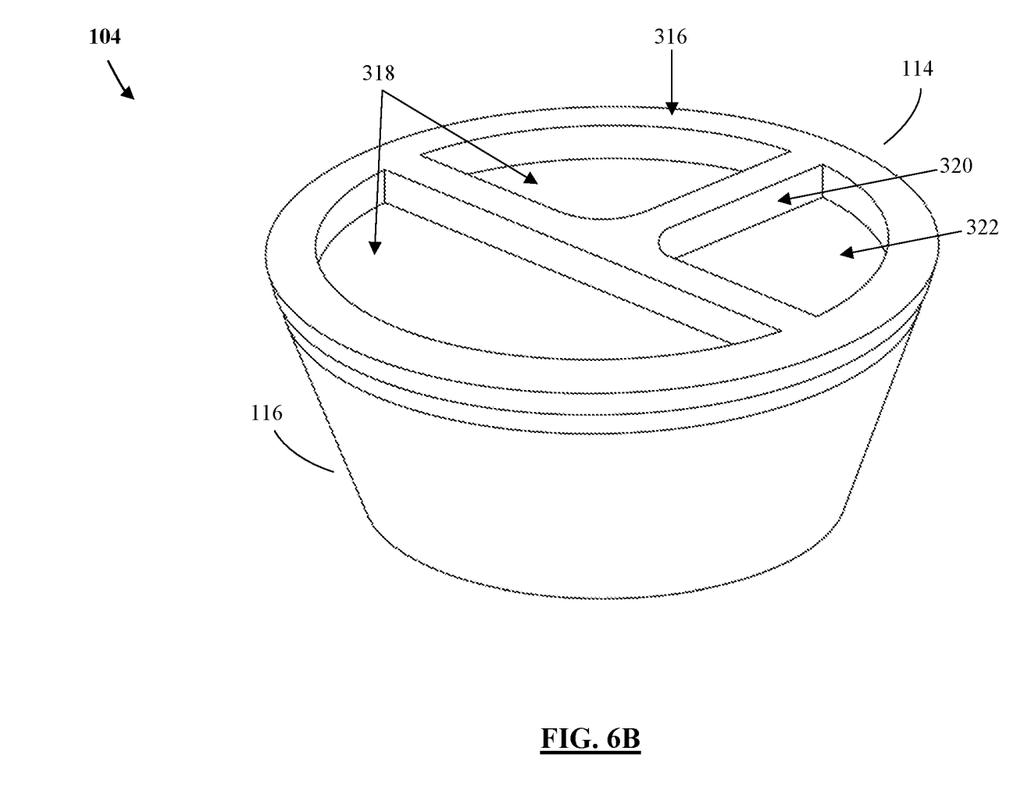
FIG. 6B is a perspective view of an inner container assembly, in accordance with an embodiment.

Referring now to FIGS. 6A and 6B (with cross-reference to FIG. 5), a perspective view of inner container lid 114 and a perspective view of inner container assembly 104 are shown. In accordance with an embodiment, inner container lid 114 comprises a lower lid surface 312 and an upper lid surface 316. Inner container lid 114 may further comprise a channel 314 being disposed around a perimeter or circumference of inner container lid 114. In accordance with certain embodiments, channel 314 may be disposed across a radius, a diameter, and/or a chord of a circumference of lower lid surface 312. The configuration of channel 314 may be configured to correspond to the configuration of divider 308 (as shown in FIG. 5), such that an upper portion of divider 308 is configured to be selectively interfaced with channel 314. Channel 314 may be configured to be friction fit, or otherwise mateably interfaced, with rim 302 (as shown in FIG. 5) of inner container 116. Channel 314 may be configured to be friction fit, or otherwise mateably interfaced, with an upper portion of divider 308 (as shown in FIG. 5). In accordance with certain embodiments, inner container lid 114 may further comprise two or more lid divider areas 318 being disposed on an upper lid surface 316 of inner container lid 114. The two or more lid divider areas 318 may be disposed adjacent to channel 314 and may be configured to define one or more recessed areas on upper lid surface 316. In accordance with certain embodiments, two or more lid divider areas 318 comprise one or more side walls 320 and one or more recessed surface 322. The one or more side walls 320 and one or more recessed surface 322 may be configured to be disposed within the two or more divided areas 310 (as shown in FIG. 5) to establish a removable upper surface for each of the two or more divided areas 310.

Figure 7:
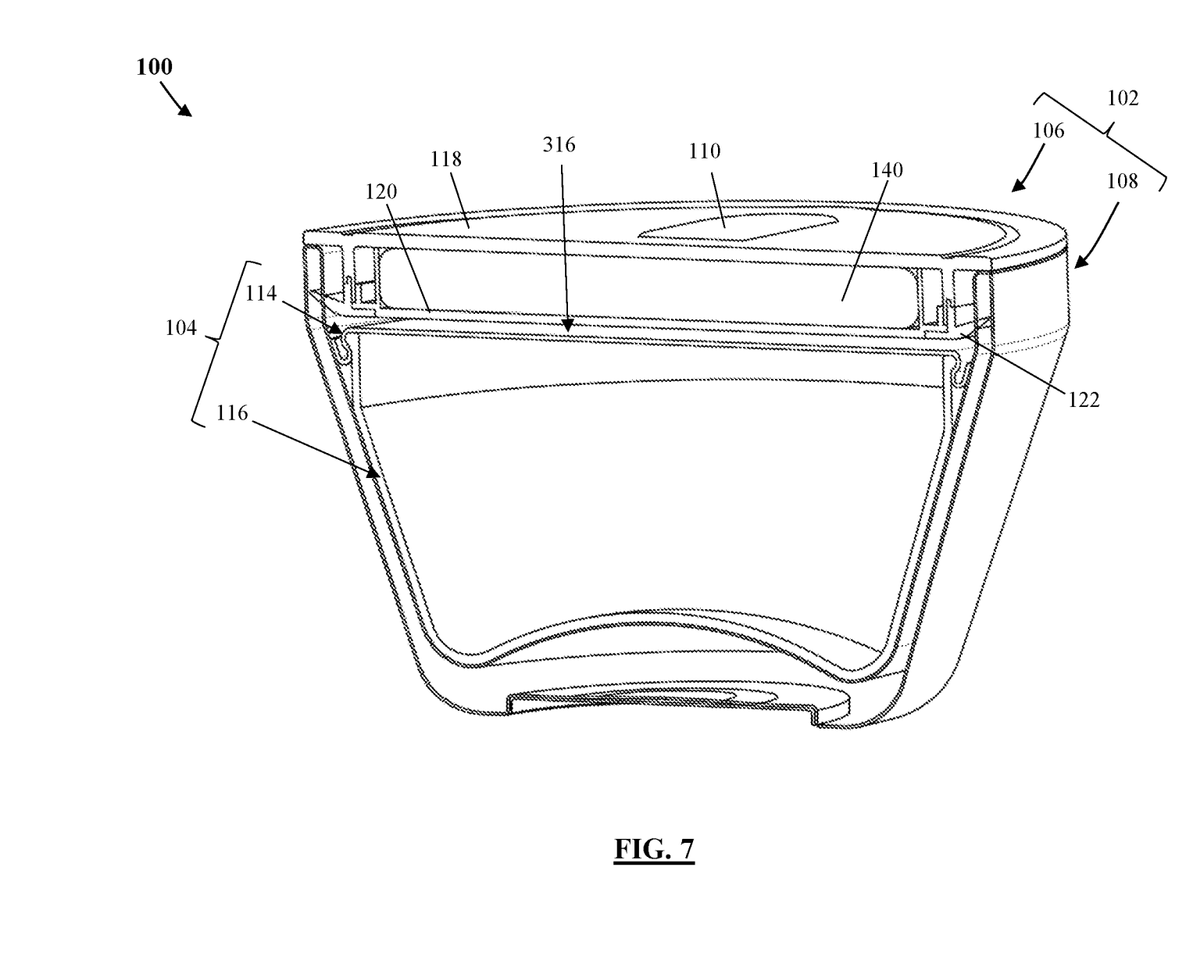
FIG. 7 is a cross-sectional view of a food storage container kit, in accordance with an embodiment.
Figure 8:
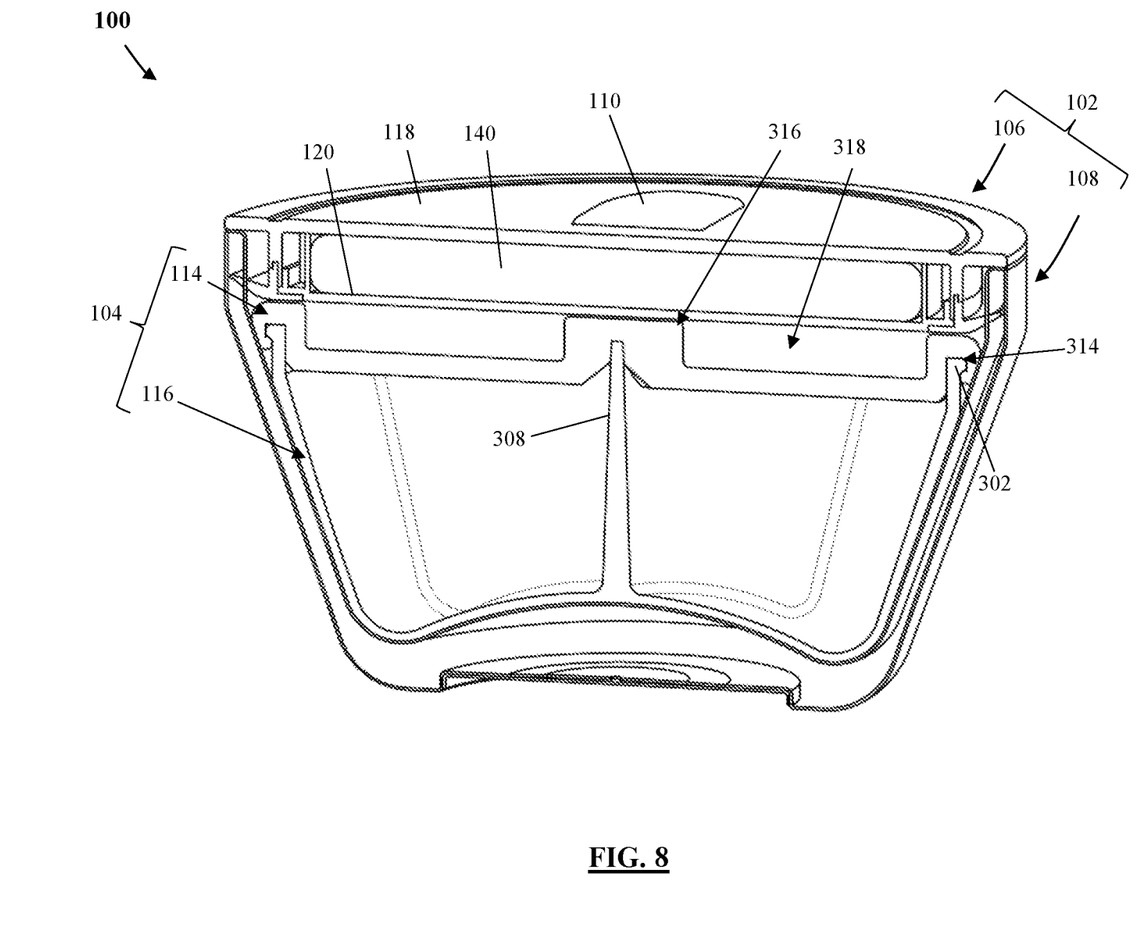
FIG. 8 is a cross-sectional view of a food storage container kit, in accordance with an embodiment.

Referring now to FIGS. 7 and 8, cross-sectional views of storage container kit 100 are shown. In accordance with an embodiment, inner container assembly 104 is configured to be securely housed within an interior portion of outer container assembly 102. Inner container 116 and insulated container 108 may be configured such that an outer surface of inner container 116 may be in direct contact with an inner surface of insulated container 108 when inner container assembly 104 is housed within outer container assembly 102. In accordance with an embodiment, inner container lid 114 and insulated lid 106 may be configured such that lower lid surface 120 of insulated lid 106 may be in direct contact with upper lid surface 316 of inner container lid 114 when inner container assembly 104 is housed within outer container assembly 102.

Figure 4A:
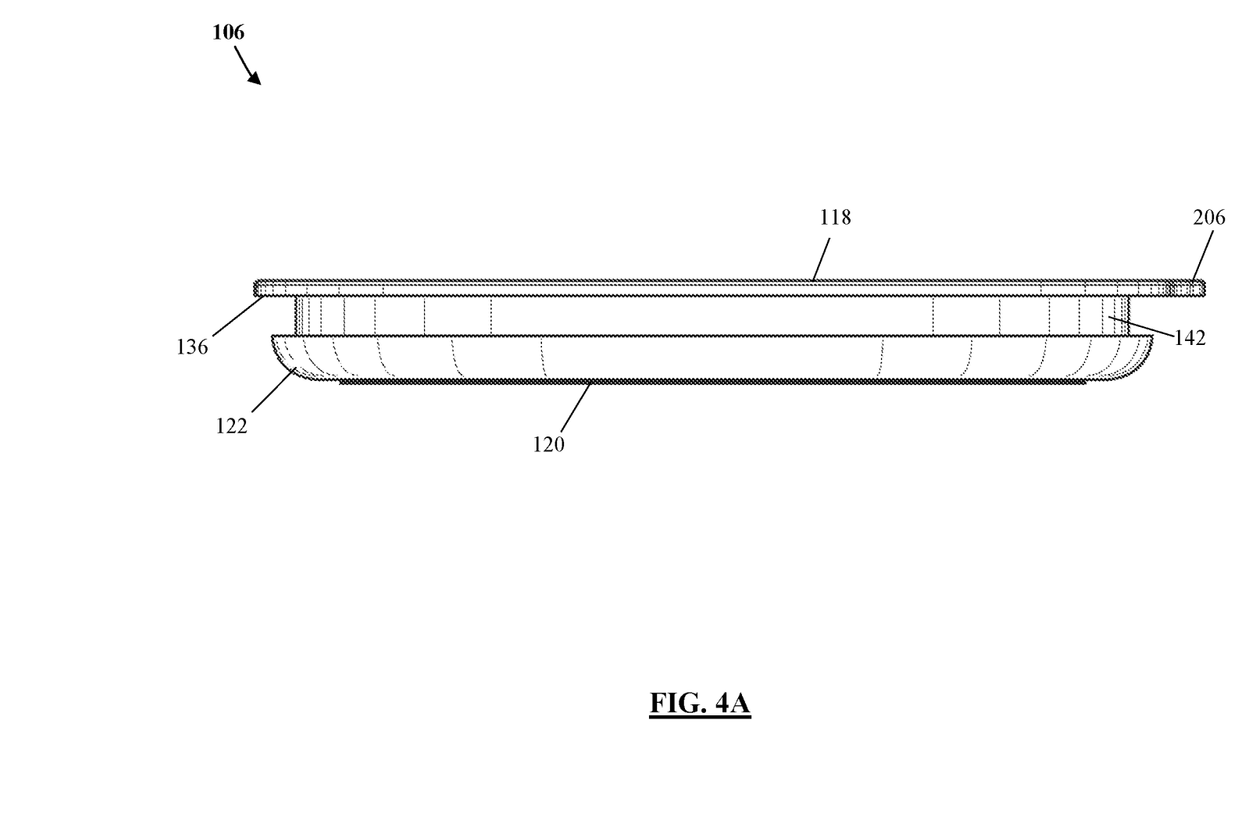
FIG. 4A is a plan view of an insulated lid, in accordance with an embodiment.
Figure 4B:
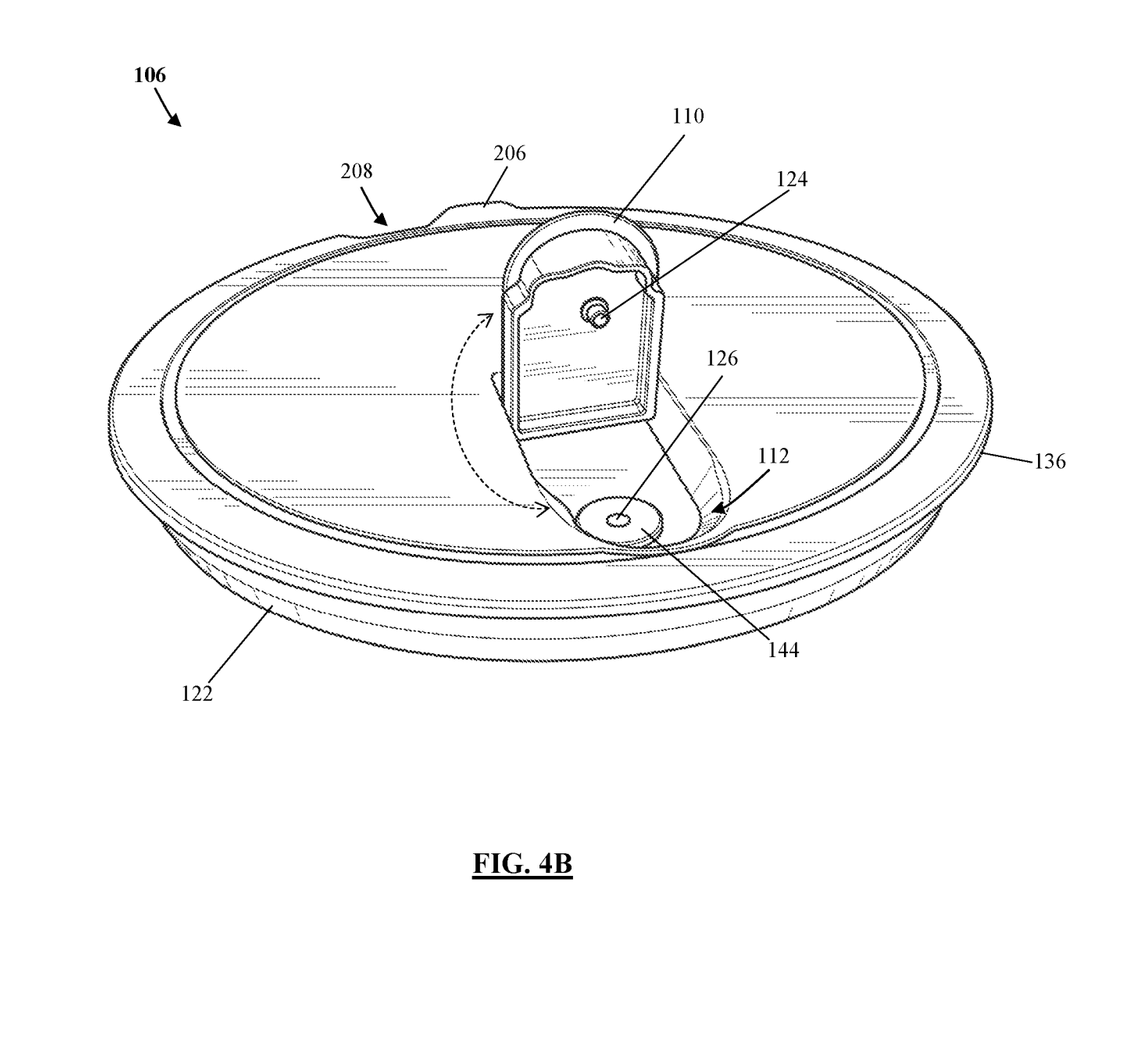
FIG. 4B is a perspective view of an insulated lid, in accordance with an embodiment.
Figure 4C:
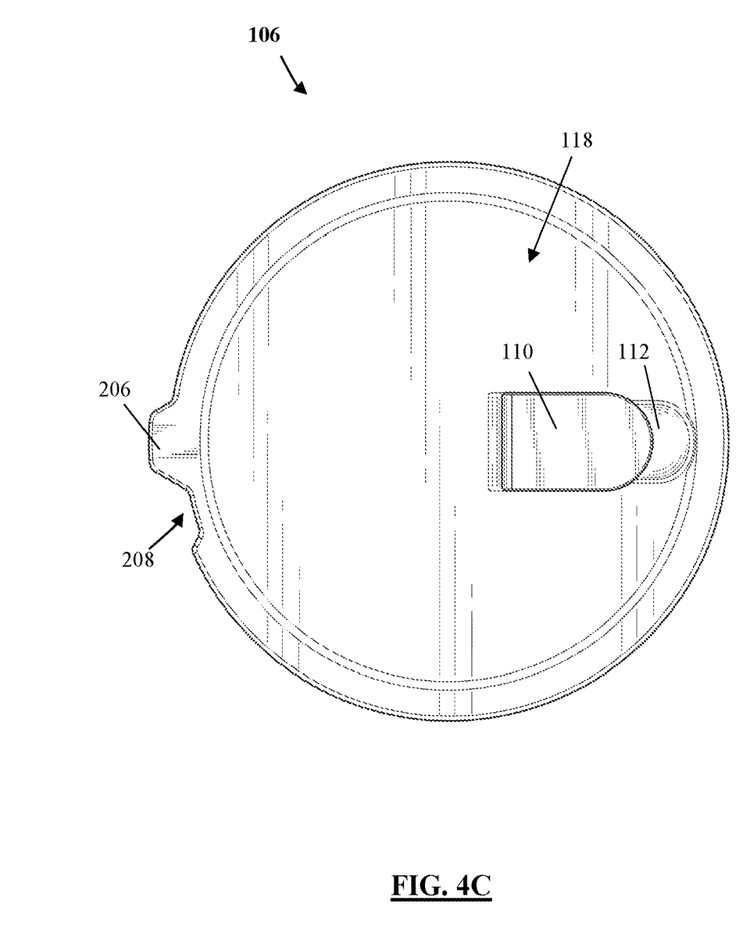
FIG. 4C is a plan view of an insulated lid, in accordance with an embodiment.
Figure 4D:
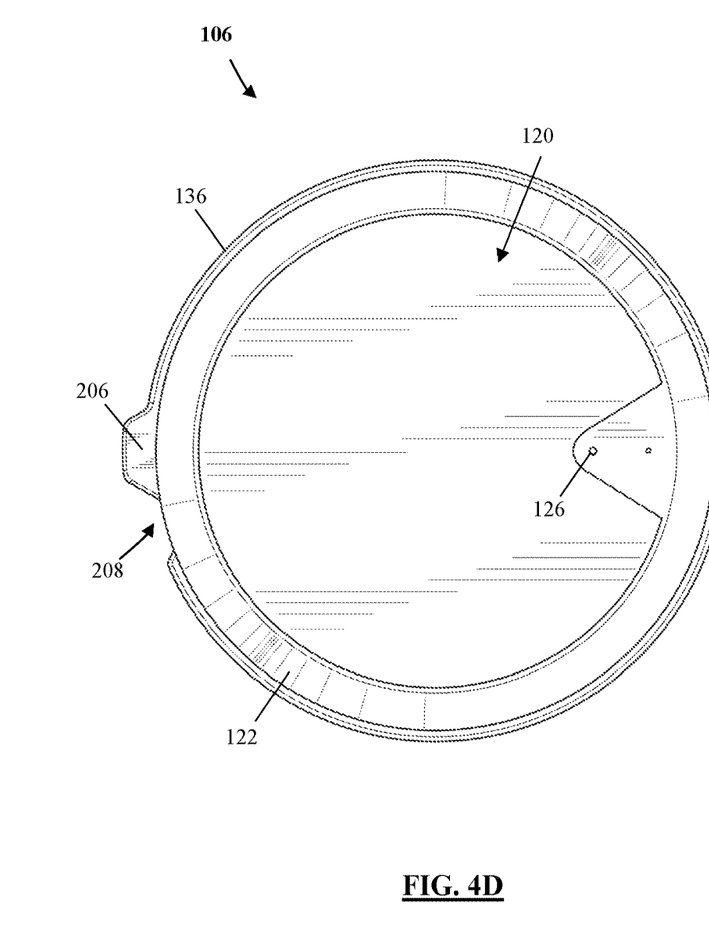
FIG. 4D is a plan view of an insulated lid, in accordance with an embodiment.

In accordance with certain aspects of the present disclosure, inner container assembly 104 may be selectively housed within an interior portion of outer container assembly 102 to comprise storage container kit 100. In an exemplary embodiment, insulated container 108 is disconnected from insulated lid 106 to expose an open top of insulated container 108. Inner container lid 114 is selectively coupled with inner container 116 to comprise inner container assembly 104. Inner container assembly 104 is placed inside an interior portion of insulated container 108 via the open top. Insulated lid 106 is configured such that cap 110 is placed in the open position (as shown in FIG. 4B) (i.e. plug 124 is disengaged from port 126, as shown in FIG. 4B). While maintaining the cap in the open position, lower surface 120 of insulated lid 106 is positioned within the interior portion of insulated container 108 via the open top, such that gasket 122 establishes an airtight seal between insulated lid 106 and insulated container 108. As insulated lid 106 is interfaced with insulated container 108, the airtight seal established by gasket 122 forces a volume of air from within the interior portion of insulated container 108 outward through port 126 (as shown in FIGS. 4B and 4D). Upon evacuating the volume of air from within the interior portion of insulated container 108 through port 126 (as shown in FIGS. 4B and 4D), cap 110 is then configured to a closed position wherein plug 124 is inserted into port 126 (as shown in FIG. 4B) to establish an airtight seal therebetween. Upon establishing the airtight seal between plug 124 and port 126 (as shown in FIG. 4B), a pressurized seal is established between insulated lid 106 and insulated container 108. The pressurized seal is configured to securely couple insulated lid 106 to insulated container 108 such that inner container assembly 104 is securely housed within the interior portion of outer container assembly 102. While securely housed within the interior portion of outer container assembly 102, contents of inner container assembly 104 (e.g. food items) are insulated within the interior portion of outer container assembly 102 such that the contents maintain a constant temperature within inner container assembly 104. Inner container assembly 104 may be selectively removed from the interior portion of outer container assembly 102 by configuring cap 110 from the closed position (as shown in FIG. 8) to the open position (as shown in FIG. 4B) to remove plug 124 from port 126 (as shown in FIG. 4B). Upon removing plug 124 from port 126 (as shown in FIG. 4B) the pressurized seal between insulated lid 106 and insulated container 108 is broken by enabling air to enter the interior portion of outer container assembly 102 via port 126 (as shown in FIG. 4B). Upward force may be applied to lip portion 206 to disengage and remove insulated lid 106 from insulated container 108. Inner container assembly 104 may then be selectively removed from the interior portion of outer container assembly 102. Inner container lid 114 may then be selectively removed from inner container 116 to expose the contents of inner container 116.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention. Therefore, it will be apparent to those skilled in the art that various modifications and variations can be made to the disclosed embodiments without departing from the scope or spirit of the invention. In view of the foregoing, it is intended that the invention covers modifications and variations of this disclosure within the scope of the following claims and their equivalents.

What is claimed is:

1. A storage container kit comprising:
   a first container comprising an outer bottom and outer side walls defining an outer surface, and an inner bottom and inner side walls defining an inner surface, wherein the outer surface and the inner surface are sealed at an upper perimeter to define an open top, wherein the upper perimeter comprises a ridge portion extending between the outer side walls and the inner side walls, wherein the outer surface and the inner surface are configured to define an internal cavity comprising a vacuum insulated portion;
   a first lid comprising an upper surface defining a first perimeter, a lower surface defining a second perimeter, an insulating portion extending between the upper surface and the lower surface, a vertical lid wall extending vertically between the upper surface and the lower surface, a gasket disposed on the vertical lid wall, an aperture disposed on the lower surface and configured to enable the passage of air through the first lid, and a plug configured to removably interface with the aperture to create an airtight seal between the plug and the aperture, wherein the upper surface comprises a ledge portion extending laterally from the vertical lid wall to the first perimeter;
   a second container comprising a bottom and side walls defining an open top, and at least one divider disposed on the bottom of the second container and the side walls of the second container to define two or more interior portions of the second container, wherein the second container is configured to be housed within an interior portion of the first container; and
   a second lid comprising an upper surface and a lower surface, wherein the upper surface of the second lid and the lower surface of the second lid are configured to define a channel configured to be selectively interfaced with the side walls of the second container and the at least one divider of the second container,
   wherein the upper surface of the second lid is configured to be in contact with the lower surface of the first lid when the second container is housed within the first container and the second lid is selectively interfaced with the second container and the first lid is selectively interfaced with the first container,
   wherein the first lid is configured to be selectively interfaced with the first container to create a pressurized seal between the gasket, the vertical side wall portion of the inner side walls of the first container, and the plug,
   wherein the pressurized seal is configured to securely couple the first lid to the first container,
   wherein the ledge portion of the first lid is configured to interface with the ridge portion of the first container such that the lower lid surface and the vertical lid wall are located within the interior portion of the first container when the ledge portion of the first lid is interfaced with the ridge portion of the first container.

2. The storage container kit of claim 1 wherein the plug is moveably coupled to the first lid to be selectively configured between a first configuration and a second configuration.

3. The storage container kit of claim 2 wherein the first lid is configured to displace a volume of air from the interior portion of the first container through the aperture where the plug is configured in the second configuration.

4. The storage container kit of claim 3 wherein the first lid is configured to create the pressurized seal in response to selectively configuring the plug from the second configuration to the first configuration.

5. The storage container kit of claim 4 wherein the first lid is configured to release the pressurized seal in response to selectively configuring the plug from the first configuration to the second configuration.

* * * * *